April 14, 1964  M. J. LEBOW  3,128,628
PRESSURE TRANSDUCER
Filed June 9, 1961  2 Sheets-Sheet 1
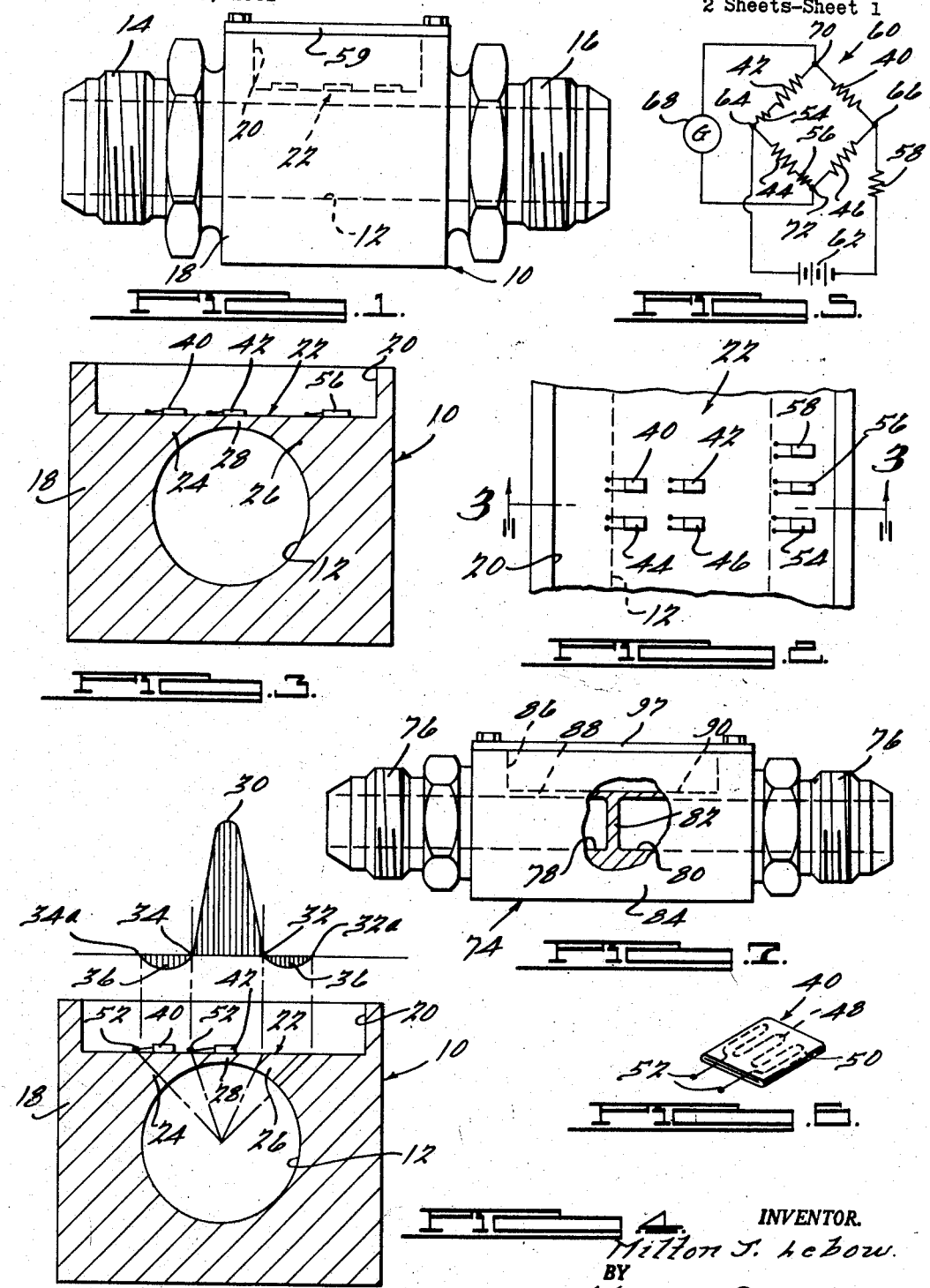
INVENTOR.
Milton J. Lebow
BY
Harness, Dickey & Pierce
ATTORNEYS

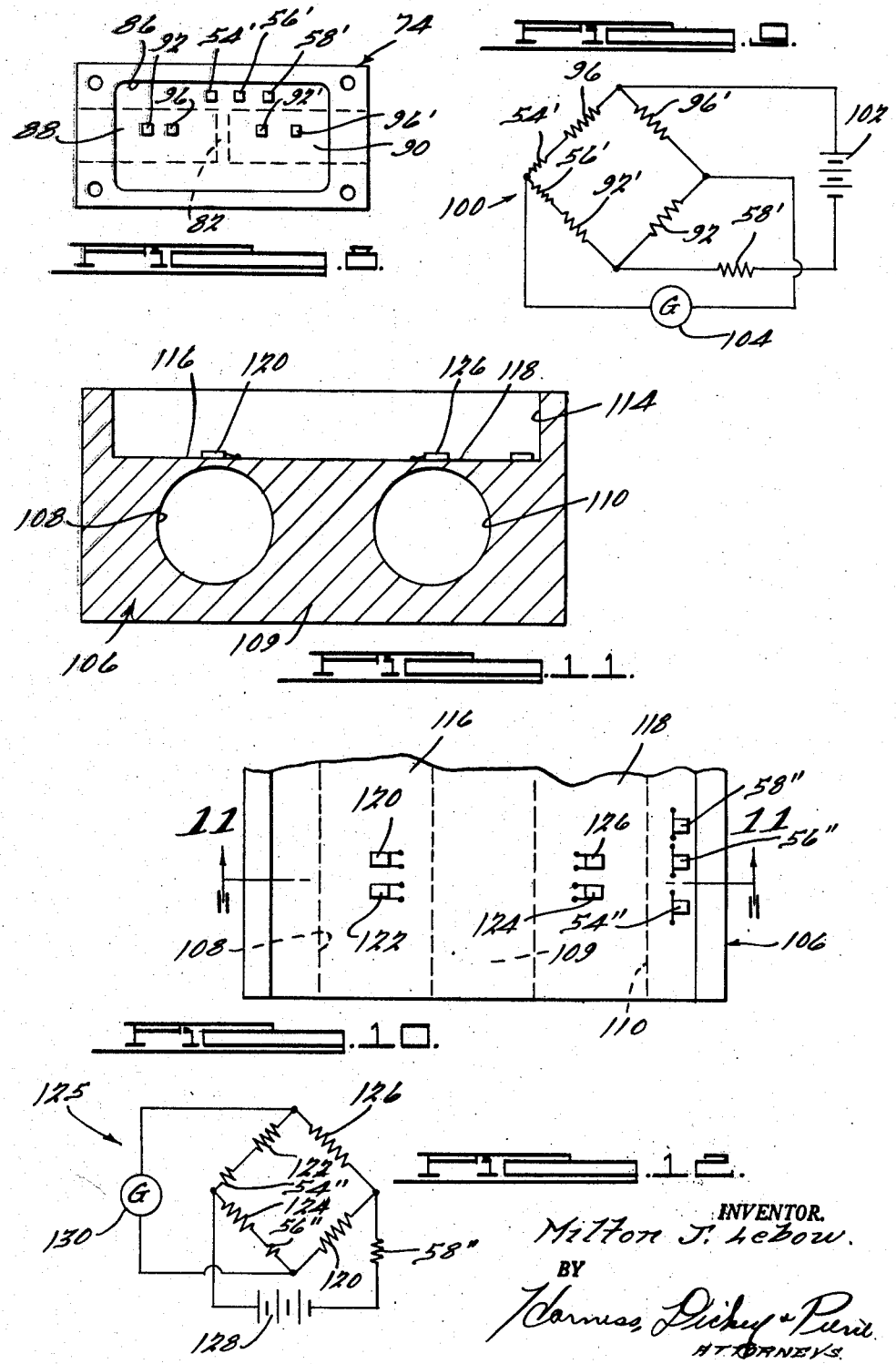

United States Patent Office 3,128,628
Patented Apr. 14, 1964

3,128,628
PRESSURE TRANSDUCER
Milton J. Lebow, Oak Park, Mich., assignor to Lebow Associates, Inc., Oak Park, Mich., a corporation of Michigan
Filed June 9, 1961, Ser. No. 116,032
12 Claims. (Cl. 73—398)

This invention relates to force-measuring devices of the type employing a strain sensitive force-responsive element, and more particularly to devices of the aforesaid type that are especially adapted for measuring fluid pressures.

A primary object of the present invention is to increase the fatigue life of a fluid pressure transducer having strain sensitive force-responsive elements with a high electrical output.

A further object of the invention is to provide an improved pressure transducer which is compact, economical and quickly mounted as an integral portion of a pressurized piping system without requiring line taps and which is insensitive to bending and torque when in an unsupported pipeline.

A still further object of the present invention is to provide an improved pressure tranducer having a thin wall portion of varying thickness to provide a stress distribution thereacross having spaced neutral stress zones between measurable tension and compression stress regions.

A still further object of the invention is to locate a plurality of strain sensitive force-responsive elements on a thin wall portion of an improved pressure transducer so that lead lines will contact terminals of the force-responsive elements substantially within neutral stress zones on the improved pressure transducer with the remainder of the force-responsive element being disposed either in a high tension region or a high compression region for maintaining a high degree of electrical strain gage output.

Further objects, features and advantages of this invention will become apparent from a consideration of the following description, the appended claims and the accompanying drawing in which:

FIGURE 1 is an elevation of one embodiment of the invention;

FIGURE 2 is a partial plan view of the embodiment illustrated in FIGURE 1 showing the location of strain sensitive force-responsive elements;

FIGURE 3 is a vertical sectional view taken along the line 3—3 of FIGURE 2;

FIGURE 4 is a vertical sectional view similar to FIGURE 2 having a stress distribution curve imposed thereover to illustrate the stress distribution within the embodiment illustrated in FIGURE 1;

FIGURE 5 is a diagrammatic representation of a bridge circuit;

FIGURE 6 is an enlarged perspective view of a typical electrical strain gage to be fastened to the transducer body;

FIGURE 7 is an elevation, partially broken away, of a second embodiment of the invention;

FIGURE 8 is a plan view of a portion of the embodiment illustrated in FIGURE 7 showing the location of strain sensitive force-responsive elements;

FIGURE 9 is a diagrammatic representation of a bridge circuit containing the strain sensitive force-responsive force-responsive elements of the second embodiment;

FIGURE 10 is a partial plan view of a third embodiment of the invention;

FIGURE 11 is a vertical sectional view taken along the line 11—11 of FIGURE 10; and FIGURE 12 is a diagrammatic representation of a bridge circuit containing the strain sensitive force-responsive elements of the third embodiment.

Referring now to the drawings, the embodiment illustrated in FIGURES 1-6 includes a transducer body generally designated 10 having a bore 12 extending axially therethrough. Each end of the body 10 has conventional pipe threaded portions 14, 16 so that the body 10 can be easily connected in standard piping systems without restricting fluid flow therethrough.

The top of the mid-section 18 of the body 10 has a recess 20 formed therein. Intermediate the recess 20 and the axially extending bore 12 is a thin wall portion 22.

The thin wall portion 22 has outer edge portions 24, 26 of greater thickness than its center portion 28. Thus, when pressure in the axially extending bore 12 strains the transducer body 10 including the thin wall portion 22, a stress configuration as illustrated in FIGURE 4 occurs.

The stress configuration is uniquely suited to the objects of the present invention. Straining the thin wall portion 22 of the improved pressure transducer causes a high positive stress 30 to occur at the center portion 28. This stress rapidly drops to zero on either side of the center portion 28 resulting in two neutral stress regions 32, 34 which extend along the length of the thin wall portion 22. A substantial negative stress region 36 exists on the outer side of each of the neutral stress zones 32, 34 as illustrated. Neutral stress regions 32a, 34a occur at the strain insensitive edges of the thin wall 22.

It has been found that the configuration of the thin wall portion 22 and the resultant stress distribution is unusually suited for improved pressure transducer performance when combined with strain sensitive force-responsive elements in a manner to be discussed.

The thin wall portion 22 carries a plurality of strain sensitive force-responsive elements 40, 42, 44, 46 which are representatively illustrated in FIGURE 6 as strain gages having a continuous fine wire filament 48, shown in broken lines, formed as a grid and embedded between two sheet of insulating material 50 from which two ends of the wire project as terminal portion 52. When fastened to a surface undergoing mechanical strain, such a gage undergoes equivalent strain in such a manner as to proportionately change the electrical resistance properties of the wire filament 48. The terminal portions 52 of the continuous wire filaments 48 connect to suitable lead lines (not shown) which connect the strain gages 40, 42, 44, 46 in a circuit to be described.

The placement of the strain gages 40, 42, 44, 46 on the outer surface of the thin wall portion 22 results in the improved pressure transducer having a long fatigue life under normal heavy usage. The terminal portions 52 of the strain gages 40, 42, 44, 46 are located substantially along the neutral stress regions 32, 34 and 32a, 34a of the pressure transducer. Thus, during cyclical operation in which the pressure transducer is alternately pressurized and depressurized, the continuous strain gage filament 48 will be strained in the plus and minus stress regions but the interconnection between the lead lines and the terminal portions 52 of the strain gage filaments will be subject to little or no stress. Therefore, the interconnection between the terminal portions 52 of the strain gage filaments 48 and the lead lines running therefrom will not fatigue fail following a relatively small number of cycles of operation.

Furthermore, the recess 20 has a depth which places the strain gages 40, 42, 44, 46 very close to the neutral axis of the transducer body 10. The gages are therefore essentially insensitive to bending and torsional forces in the piping system which act on the transducer body 10.

A temperature-responsive resistance 54 located on the outermost edge of the outer surface of the wall portion 22 changes resistance with temperature. This is a factory adjustment which compensates for zero shift of the main strain gages 40-46 and the transducer body 10 with temperature. Another small resistance 56 on the wall 22 is adjustable to electrically balance the bridge circuit in which the strain gages connect. A third resistor 58 changes resistance with temperature. It is in series with the voltage supplied to a bridge illustrated in FIGURE 5 and is intended to reduce the net bridge voltage and, consequently, the transducer's output signal as temperature increases. The modulus of elasticity of the body 10 to which the strain gages 40-46 attach reduces with temperature. Therefore, for any given pressure the strain value increases with temperature and the gages have a greater output or resistance change. The third resistor 58 compensates for this temperature effect.

A plate 59 covers the recess 20 to protect the strain gages during normal heavy usage. When the cover plate 59 is suitably fastened to the transducer block 10 as by bolting or soldering, the block 10 becomes extremely rigid. This rigidity and the locating of the gages close to the neutral axis cause the transducer to be essentially insensitive to any applied load except pressure.

In FIGURE 5 the four main strain gages 40-46 are in a conventional bridge circuit generally designated 60, in which each of the gages 40-46 forms one leg of the circuit and pairs of symmetrically located gages 40, 42 and 44, 46 are connected as opposite legs of the circuit. For measurement purposes, a source of current comprising a battery 62 or the like connects between two terminals 64, 66 representing the junctions between gages 42, 44 and gages 40, 46, respectively, while a voltage sensitive instrument 68 connects between terminals 70, 72 representing, respectively, the junctions between gages 40, 42 and gages 44, 46.

It has been found that the inventive concept is especially adapted to differential pressure measurements. One embodiment of an improved pressure transducer for static differential pressure measurement is illustrated in FIGURES 7-9. It includes a pressure transducer body 74 having conventionally threaded end portions 76 and a first bore 78 extending axially through a first portion of the body 74 and a second bore 80 extending axially through a second portion of the body 74 colinear with the first bore 78. A transverse wall portion 82 separates the first and second bores 78, 80. The mid-section 84 of the transducer body 74 has a recess 86 formed in the top thereof to provide thin wall portions 88, 90 on either side of the transverse wall 82. Each thin wall portion 88, 90 has a series of strain gages 92, 96 and 92', 96' located thereon of the configuration illustrated in FIGURE 8. Each of the strain gages has a continuous filament and terminal points which are similar to those illustrated in FIGURE 6. The thin wall portions 88, 90 each have edge portions thicker than the centermost portion thereof similar to the thin wall portion 22 illustrated in FIGURE 3. Therefore, neutral stress regions are present in the outer surface of the thin wall portions 88, 90. The terminal portions of the strain gages 92, 96, and 92', 96' are located in these regions to improve the fatigue life of the improved differential pressure transducer. A plate 97 covers the recess 86 to protect the strain gages 92, 96 and 92', 96'.

Each of the strain gages 92, 96 and 92', 96' is included in the legs of a conventional bridge circuit 100 as illustrated in FIGURE 9. The bridge has a power source 102 and connects to a voltage sensitive instrument 104 for indicating the pressure differential existing across the transverse plate 82 illustrated in FIGURE 7. Compensating resistances 54', 56' and 58' are provided having the same function as their counterparts 54-58 in the first embodiment.

Another embodiment found especially suitable for measuring differential pressures without restricting flow is illustrated in FIGURES 10-12 and includes a transducer body 106 having a first axially extending bore 108 and a second axially extending bore 110 in spaced parallelism with the first bore. Each of the bores 108, 110 extend through the transducer body 106 to terminate in threaded end portions similar to those illustrated in FIGURES 1 and 7. A rigid transverse wall 109 separates the bores 108, 110.

Thus the unit can be located in two continuous piping systems by connecting the threaded end portions therein. The transducer body 106 has an upper recess 114 formed therein overlying the spaced parallel bores 108, 110 running through the transducer body. Thus, a pair of spaced thin wall portions 116, 118 are formed in the transducer body 106 which have stress distribution patterns similar to that illustrated in FIGURE 4 for each of the pressure systems. A series of strain gages 120-126 are mounted on the outer surface of the thin wall portions 116, 118 as illustrated in FIGURE 10 with each of their terminal points located in neutral stress regions similar to those illustrated in FIGURE 4. The strain gages 120-126 connect in a conventional bridge circuit 125 in a manner similar to the gages in the bridge circuit illustrated in FIGURE 9. The bridge circuit 125 has a power source 128 and a voltage sensitive instrument 130 for indicating the pressure differential between the pressure sources connected to the bores 108, 110. Compensating resistance 54"-58" are provided in this embodiment of the invention which are analogous to resistances 54-58 and 54'-58' discussed in the earlier embodiments.

Thus, it can be appreciated that I have developed a pressure transducer having a compact body which is readily adapted to be inserted in a pressurized fluid flow system for either measuring a single pressure source or indicating a differential pressure between different pressure systems. My pressure transducer has a configuration which when combined with conventional strain gages results in a pressure transducer having an exceptionally long fatigue life as a result of reducing failures at the connection between lead lines and the termini of the continuous filaments of the strain gages.

It will be understood that the specific embodiments of the improved pressure transducer which are herein disclosed and described are presented for purposes of explanation and illustration and are not intended to indicate limits of the invention, the scope of which are defined by the following claims.

What is claimed is:

1. A pressure transducer comprising a body having a thin wall portion varying in thickness to provide adjacent tension and compression stress zones with a neutral stress zone therebetween, and strain gage means on the surface of said thin wall portion having terminals in said neutral stress zone so as to improve the fatigue life of said pressure transducer.

2. A pressure transducer comprising a body, means defining a bore in said body, said body having a thin wall portion with a center portion and an outer edge portion of greater thickness than said center portion, and a plurality of force-responsive strain gages on the outer surface of said thin wall portion having terminal portions overlying neutral stress zones between said center portion and said outer edge portion for improving the fatigue life of said pressure transducer.

3. A pressure transducer comprising a body, means defining a longitudinally extending bore in said body, means on said body for coupling the ends of said body in a piping system, said body having a thin wall portion with a center portion and an outer edge portion of greater thickness than said center portion, and a plurality of force-responsive strain gages on the outer surface of said thin wall portion having terminal portions overlying neutral stress zones between said center portion and said outer edge portion for improving the fatigue life of said pressure transducer.

4. A pressure transducer comprising a body, means defining a longitudinally extending bore through said body, means coupling the ends of said body in a piping system causing unrestricted fluid flow through said bore, said body having a thin wall portion with a center portion and an outer edge portion of greater thickness than said center portion, and a plurality of force-responsive strain gages on the outer surface of said thin wall portion having terminal portions overlying neutral stress zones between said center portion and said outer edge portion for improving the fatigue life of said pressure transducer.

5. A pressure transducer comprising a body, means defining a first bore in said body, means defining a second bore in said body, a rigid wall means separating said first and second bores, said body having a thin wall portion overlying said first and second bores, said thin wall portion including a center portion and an outer edge portion of greater thickness than said center portion, a first plurality of force-responsive strain gages on the outer surface of said thin wall portion adjacent said first bore, a second plurality of force-responsive strain gages on the outer surface of said thin wall portion adjacent said second bore, and said first and second force-responsive strain gages having terminals overlying neutral stress zones between said center portion and said outer edge portion for improving the fatigue life of said pressure transducer.

6. A pressure transducer comprising a body, means defining a first bore in said body, means defining a second bore in said body, a rigid wall means separating said first and second bores, means on said body for coupling the ends of said body in a piping system, means defining a recess in said body including a thin wall portion overlying said first and second bores, said thin wall portion including a center portion and an outer edge portion of greater thickness than said center portion, a first plurality of force-responsive strain gages on the outer surface of said thin wall portion adjacent said first bore, a second plurality of force-responsive strain gages on the outer surface of said thin wall portion adjacent said second bore, said first and second force-responsive strain gages having terminals overlying neutral stress zones between said center portion and said outer edge portion for improving the fatigue life of said pressure transducer, and means sealing said recess from the exterior of protect said strain gages.

7. A pressure transducer comprising a body, means defining a first bore in said body, means defining a second bore in said body, a rigid wall means separating said first and second bores, means including said rigid wall restricting flow of fluid through said body, means defining a recess in said body including a thin wall portion overlying said first and second bores, said thin wall portion including a center portion and an outer edge portion of greater thickness than said center portion, a first plurality of force-responsive strain gages on the outer surface of said thin wall portion adjacent said first bore, a second plurality of force-responsive strain gages on the outer surface of said thin wall portion adjacent said second bore, and said first and second force-responsive strain gages having terminals overlying neutral stress zones between said center portion and said outer edge portion for improving the fatigue life of said pressure transducer.

8. A pressure transducer comprising a body, means defining a first bore in said body, means defining a second bore in said body, a rigid wall means separating said first and second bores, means including said first and second bores allowing unrestricted fluid flow through said body, means defining a recess in said body including a thin wall portion overlying said first and second bores, said thin wall portion including a center portion and an outer edge portion of greater thickness than said center portion, a first plurality of force-responsive strain gages on the outer surface of said thin wall portion adjacent said first bore, a second plurality of force-responsive strain gages on the outer surface of said thin wall portion adjacent said second bore, and said first and second force-responsive strain gages having terminals overlying neutral stress zones between said center portion and said outer edge portion for improving the fatigue life of said pressure transducer.

9. A pressure transducer comprising a body, means defining a first longitudinal bore through said body, means defining a second bore through said body in spaced parallelism with said first bore, a rigid wall means separating said first and second bores, means for coupling the ends of said body in two piping systems to allow unrestricted fluid flow through said first and second bores, means including a thin wall portion defining a recess in said body overlying said first and second bores, said thin wall portion including a center portion and an outer edge portion of greater thickness than said center portion, a first plurality of force-responsive strain gages on the outer surface of said thin wall portion adjacent said first bore, a second plurality of force-responsive strain gages on the outer surface of said thin wall portion adjacent said second bore, and said first and second force-responsive strain gages having terminals overlying neutral stress zones between said center portion and said outer edge portion for improving the fatigue life of said pressure transducer.

10. A pressure transducer comprising a body, means defining a first longitudinally extending bore in said body, means defining a second longitudinally extending bore in said body colinear with said first bore, a transverse rigid wall means separating said first and second bores restricting fluid flow through said first and second bores, means including a thin wall portion defining a recess in said body overlying said first and second bores, said thin wall portion including a center portion and an outer edge portion of greater thickness than said center portion, a first plurality of force-responsive strain gages on the outer surface of said thin wall portion adjacent said first bore, a second plurality of force-responsive strain gages on the outer surface of said thin wall portion adjacent said second bore, and said first and second force-responsive strain gages having terminals overlying neutral stress zones between said center portion and said outer edge portion for improving the fatigue life of said pressure transducer.

11. A pressure transducer comprising a body, means on said body for coupling the ends of said body in a piping system, means defining a recess in said body including a thin wall portion located substantially along a neutral axis of said body so that said thin wall portion is essentially insensitive to bending and torque forces in said piping system, said thin wall portion varying in thickness to provide adjacent tension and compression stress zones with a neutral stress zone therebetween, and strain gage means on the surface of said thin wall portion having terminals at the juncture between said tension and compression stress zones within said neutral stress zone for improving the fatigue life of said pressure transducer.

12. A pressure transducer comprising a body, means on said body for coupling the ends of said body in a piping system, means defining a recess in said body including a thin wall portion located substantially along a neutral axis of said body so that said thin wall portion is essentially insensitive to bending and torque forces in said piping system, said thin wall portion having a center portion and an outer edge portion of greater thickness than said center portion, and strain gage means on the surface of said thin wall portion having terminal portions overlying neutral stress zones between said center portion and said outer edge portion for improving the fatigue life of said pressure transducer.

References Cited in the file of this patent

UNITED STATES PATENTS

| | | |
|---|---|---|
| 2,342,374 | Shayne et al. | Feb. 22, 1944 |
| 2,470,714 | Nevius | May 17, 1949 |
| 2,747,408 | Boytim et al. | May 29, 1956 |
| 2,913,690 | McGrath | Nov. 17, 1959 |
| 2,920,487 | Green | Jan. 12, 1960 |